United States Patent
Weng (10) Patent No.: US 8,808,070 B2
(45) Date of Patent: Aug. 19, 2014

(54) BULK MEAT CUTTING APPARATUS

(71) Applicant: Chao Jing Weng, Alexandria, LA (US)

(72) Inventor: Chao Jing Weng, Alexandria, LA (US)

(\*) Notice: Subject to any disclaimer, the term of this patent is extended or adjusted under 35 U.S.C. 154(b) by 0 days.

(21) Appl. No.: 13/727,360

(22) Filed: Dec. 26, 2012

(65) Prior Publication Data
US 2014/0179209 A1    Jun. 26, 2014

(51) Int. Cl.
*A22C 21/00*    (2006.01)
*A22C 17/00*    (2006.01)

(52) U.S. Cl.
CPC .................................. *A22C 17/0013* (2013.01)
USPC ....................................................... 452/194

(58) Field of Classification Search
USPC ............ 452/194, 102, 103, 198; 83/167, 762, 83/743, 821, 454; 30/289, 114, 312, 313
See application file for complete search history.

(56) References Cited

U.S. PATENT DOCUMENTS

| | | | | | |
|---|---|---|---|---|---|
| 2,679,274 | A | \* | 5/1954 | Criner | 83/762 |
| 3,318,352 | A | \* | 5/1967 | Seltzer | 269/288 |
| 3,452,795 | A | \* | 7/1969 | Davies | 83/762 |
| 4,056,026 | A | \* | 11/1977 | Panaritis et al. | 83/454 |
| 4,934,026 | A | \* | 6/1990 | McNerney | 99/537 |
| 4,974,291 | A | \* | 12/1990 | McNerney | 452/196 |
| 6,202,529 | B1 | \* | 3/2001 | Hodsdon | 83/870 |

\* cited by examiner

*Primary Examiner* — Richard Price, Jr.

(57) ABSTRACT

A product for quickly cutting large quantities of meat into similarly sized pieces includes a cutting board, a hollow enclosure, and a top inserting press. The cutting board serves as a bottom surface for the hollow enclosure. The hollow enclosure is filled with food that needs to be cut, like raw chicken, after which the top inserting press is used to press the food down. The hollow enclosure has slits cut into each wall, with paired walls having matching slits. These slits run from top to bottom and allow a knife to cut through food held in the hollow enclosure. The slits are equally spaced from each other, resulting in food that is cut into equal pieces. The product is designed to allow a person to quickly cut large amounts of meat. The product is also intended to be easy to set up, use, and sanitize.

13 Claims, 10 Drawing Sheets

BULK MEAT CUTTING APPARATUS

FIELD OF THE INVENTION

The present invention relates generally to a container for quickly and efficiently cutting large amounts of meat into regularly sized pieces.

BACKGROUND OF THE INVENTION

Preparing raw and cooked foods, such as chicken, is an important part of the restaurant business. To feed the clientele, a large amount of foods must be prepared. This often includes cutting large items, like chicken thighs and breasts, into smaller pieces. Many restaurants accomplish this by having an employee dice the entire batch of chicken one piece at a time. While this method may be sufficient in a home kitchen, in a restaurant setting this is time intensive. Employees must commit a large amount of time, up to an hour, to cut the daily batch of chicken, while managers are also required to train new employees in the proper preparation methods.

While there are various products available to speed up the process, these products have their own drawbacks. For example, boneless fresh chicken thighs are too soft to be put into meat and cheese slicers. While multi-bladed slicing machines exist, they produce irregularly sized bits of chicken and often times fail to fully separate the cut chicken pieces. In addition, cleaning slicing machines is a labor intensive, negating some of the time saved when compared to slicing by hand.

It is therefore an object of the present invention to provide an apparatus capable of quickly cutting a large amount of raw meat into regularly sized chunks. It is a further object of the present invention to provide a food cutting apparatus which is simple, easy to use, and easy to clean.

DETAIL DESCRIPTIONS OF THE INVENTION

All illustrations of the drawings are for the purpose of describing selected versions of the present invention and are not intended to limit the scope of the present invention.

The present invention is an apparatus designed for fast and efficient cutting of raw or cooked foods. The present invention comprises a hollow enclosure 1, a top inserting press 2, and a cutting board 3. The hollow enclosure 1 (FIG. 1) slides over the cutting board 3 (FIG. 2), such that the cutting board 3 forms a bottom for the hollow enclosure 1. After food products are placed in the hollow enclosure 1 the inserting press is placed in the hollow enclosure 1, above the food products. A user then uses the top inserting press 2 (FIG. 3) to push down on the food products, holding the food products in place so that they may be cut by a knife 5. The arrangement of the present invention is illustrated in FIG. 4 and FIG. 5. In the preferred embodiment the food products are raw meats, such as chicken. However, the present invention may still be used to cut any type of food product, including vegetables, meats, raw items, and cooked items.

Figure 1:
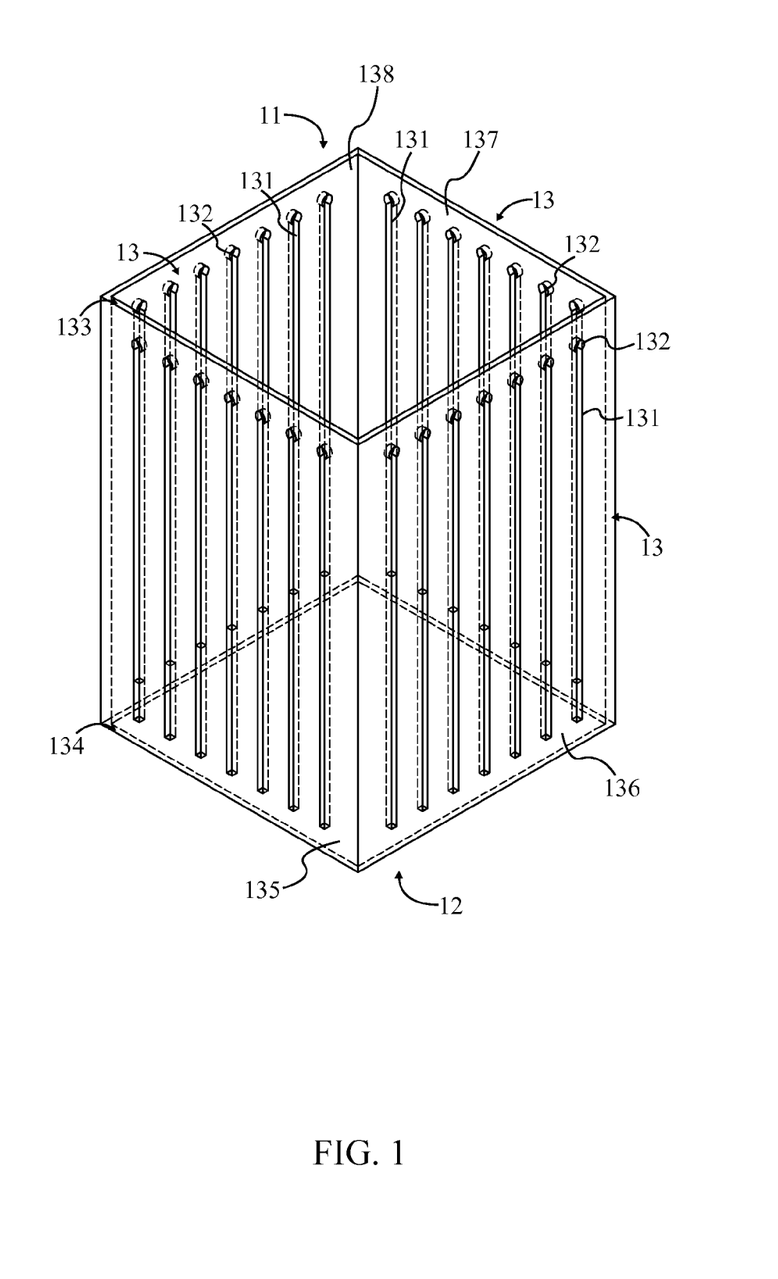
FIG. 1 is a perspective view of a hollow enclosure of the present invention.
Figure 2:
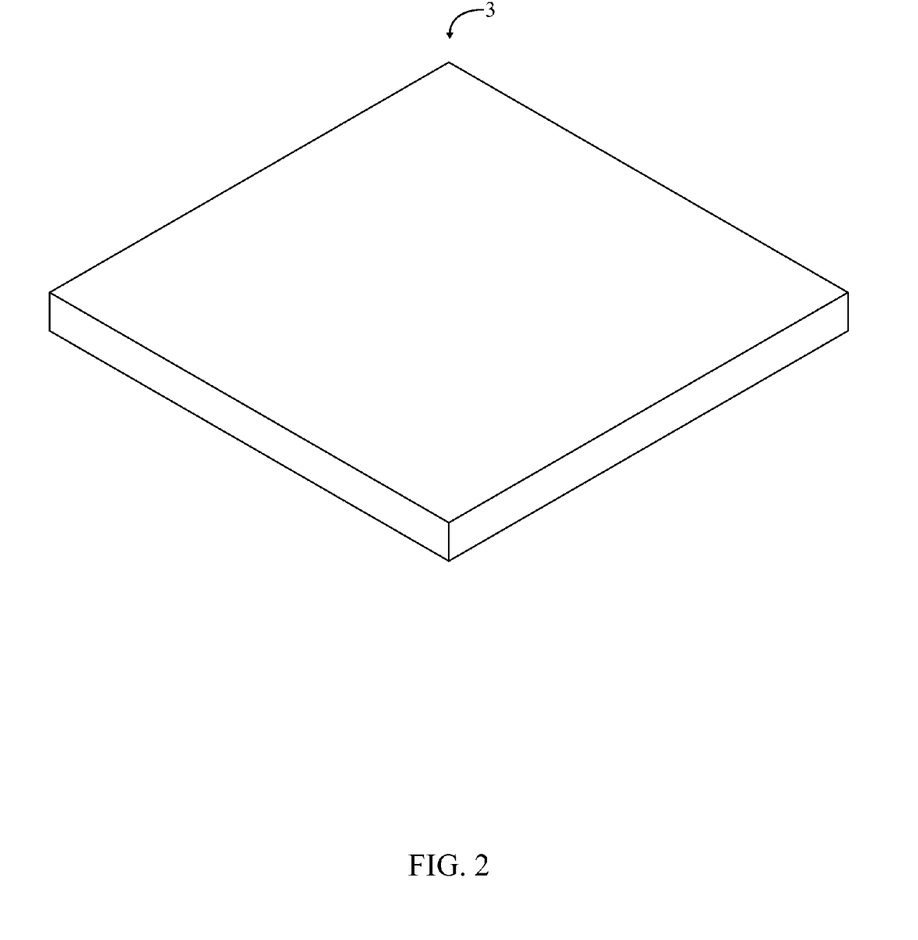
FIG. 2 is a perspective view of a cutting board of the present invention.

The hollow enclosure 1 comprises a top opening 11, a bottom opening 12, and a plurality of walls 13, as shown in FIG. 1, FIG. 4, and FIG. 5. The plurality of walls 13 form the sides of the enclosure. The plurality of walls 13 each comprise a top end 133, a base end 134, and a plurality of enclosure guide slits 131. The plurality of walls 13 are connected to each other to form the sides of the enclosure, with the top ends 133 of the plurality of walls 13 defining the top opening 11 of the hollow enclosure 1, while the base ends 134 of the plurality of walls 13 define the bottom opening 12 of the hollow enclosure 1. The plurality of enclosure guide slits 131 are placed at equal intervals across each of the plurality of walls 13, with a specific interval spacing 4 between separating each of the enclosure guide slits 131. The enclosure guide slits 131 are designed to receive the blade of a knife 5 and guide said knife 5 blade in a straight line through the raw chicken that is to be cut. The plurality of enclosure guide slits 131 are aligned such that they run from top-to-bottom. Along with the above placement, the plurality of enclosure guide slits 131 each comprise a widened tip 132. This widened tip 132 is positioned adjacent to the top end 133 of the wall, and provides a larger area for a knife 5 to be inserted into, after which said knife 5 can be passed through the narrower section of the enclosure guide slits 131.

In other embodiments, the plurality of enclosure guide slits 131 could be designed to run side-to-side, but this comes with several drawbacks. For one, with side-to-side enclosure guide slits 131, the cutting action would be impart a sideways force on the hollow enclosure 1, potentially moving the enclosure while cutting the chicken. With top-to-bottom enclosure guide slits 131, the cutting action imparts a downward force on the hollow enclosure 1. This orientation is less likely to result in movement of the hollow enclosure 1 and as a result is safer than an embodiment utilizing side-to-side enclosure guide slits 131. Another advantage of the top-to-bottom orientation of enclosure guide slits 131 is increased efficiency. Many consider cutting downward to be a more natural motion than cutting sideways; in addition, cutting downward is aided by gravity, whereas cutting sideways is not. As a result, though other embodiments are possible, the preferred embodiment utilizes enclosure guide slits 131 that run from top-to-bottom.

In the preferred embodiment, the plurality of walls 13 comprises a first wall 135, a second wall 136, a third wall 137, and a fourth wall 138. Visible in FIG. 1, these four walls are arranged to form a square shaped hollow enclosure 1. The four walls are placed such that the first wall 135 forms a corner with the second wall 136 and the fourth wall 138, while the third wall 137 is positioned opposite the first wall 135. Similar to the first wall 135, the third wall 137 forms corners with the second wall 136 and the fourth wall 138. The positioning of the walls results in paired enclosure guide slits 131 (enclosure guide slits 131 on parallel walls) being aligned with each other. As a result, the plurality of enclosure guide slits 131 on the first wall 135 are aligned and coincident with the plurality of enclosure guide slits 131 on the third wall 137. Likewise, the plurality of enclosure guide slits 131 on the second wall 136 are aligned and coincident with the plurality of enclosure guide slits 131 on the fourth wall 138. This allows the a user to pass a knife 5 completely through the hollow enclosure 1, which is essential to fully cutting the chicken contained within the hollow enclosure 1. The two pairs of aligned enclosure guide slits 131 allow a user to quickly and efficiently dice a large quantity of chicken contained within the hollow enclosure 1.

In other embodiments the total number of walls can vary; it is possible to have a single cylindrical wall, or six-plus walls. Because of the need for parallel paired walls, there must be an even number of walls. With an odd number of walls (such as a triangle), a knife 5 would not have a plurality of enclosure guide slits 131 through which to exit, hampering the ability to cut the chicken. While a two walled embodiment meets the even number requirement, the two walls are insufficient to form the hollow enclosure 1 and would result in at least one open face. Due to a combination of practicality and simplicity, the four walled embodiment is preferred for the present invention.

Other variations for the plurality of walls 13 include providing different spacing for the plurality of enclosure guide slits 131. By increasing or decreasing the intervals between each of the enclosure guide slits 131, the raw chicken can be cut into larger or smaller pieces as desired. This can be accomplished by providing independent hollow enclosures 1, with each individual hollow enclosure 1 designed to cut chicken to a specific size. Alternatively, the plurality of walls 13 could be designed to have user adjustable enclosure guide slits 131. This could be accomplished by providing a track with several incorporated mini barriers and guide slits 131, which a user could adjust to the desired width. However, this could prove complicated and provide a potential point of failure during a health inspection, due to places for food particles to get stuck. A much simpler solution is to simply provide a larger number of closely spaced enclosure guide slits 131. A user could then finely cut food by using all the enclosure guide slits 131, or cut the food into larger chunks by only using every second or third enclosure guide slit 131, as necessary.

Additional potential features for the plurality of walls 13 include a fill line and measurement markings. A fill line could be provided to indicate the maximum amount of food that can be held in the hollow enclosure 1 while still allowing the top inserting press 2 to slide into the hollow enclosure 1. While the exact positioning of the fill line will vary with the dimensions of the hollow enclosure 1 and the top inserting press 2, in the preferred embodiment the fill line will provide two inches of clearances. As a result, the fill line will be marked on the plurality of walls 13 at a distance of two inches below the top opening 11. At various heights below the fill line, measurement markings are provided to help a user estimate the total amount of food being prepared. This provides a way for a user to eyeball the total amount of food being prepared, helpful for when the amount of food needed is less than the total capacity of the hollow enclosure 1. While these features provide added benefits, they are not essential to the function of the present invention and can be omitted if so desired.

Figure 3:
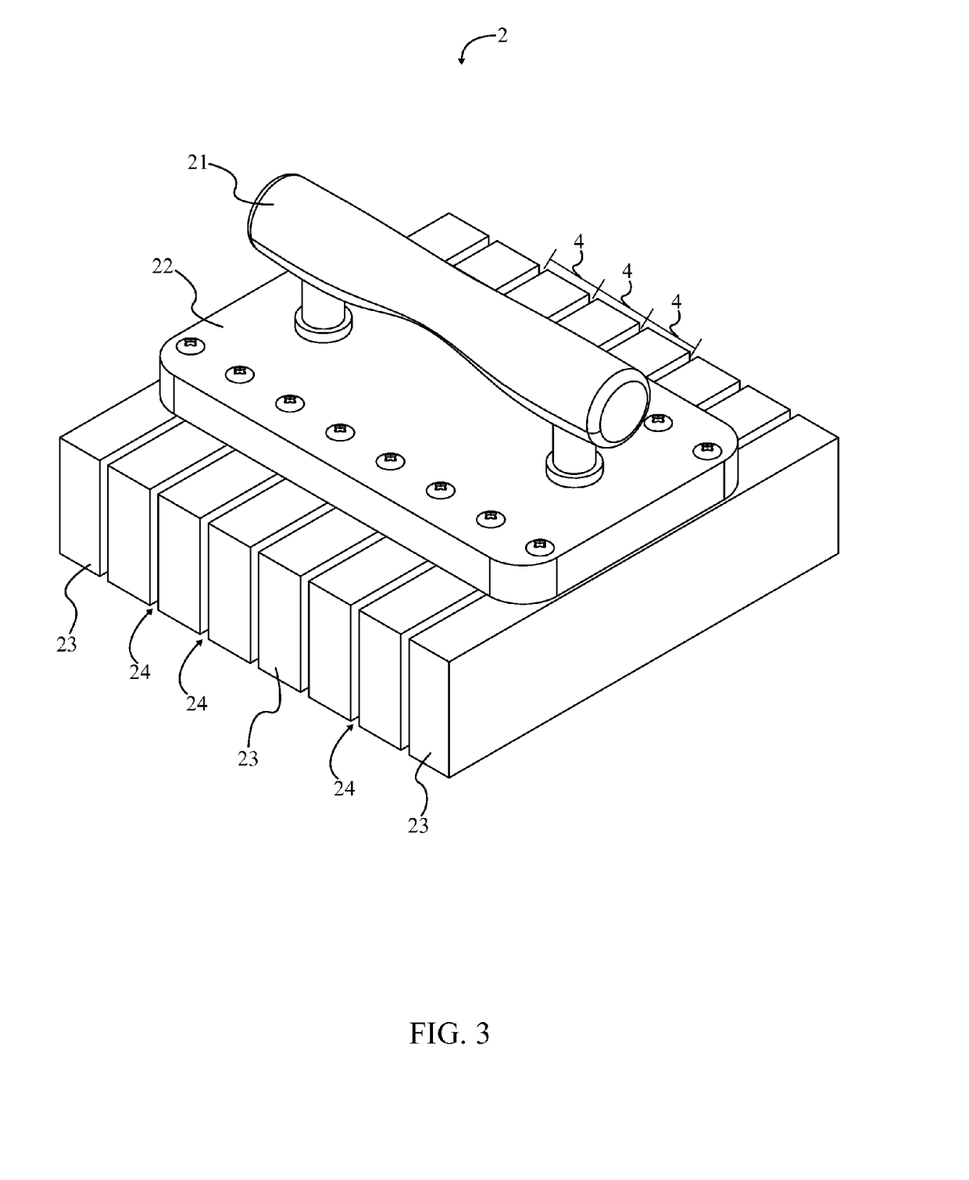
FIG. 3 is a perspective view of a top inserting press of the present invention.
Figure 4:
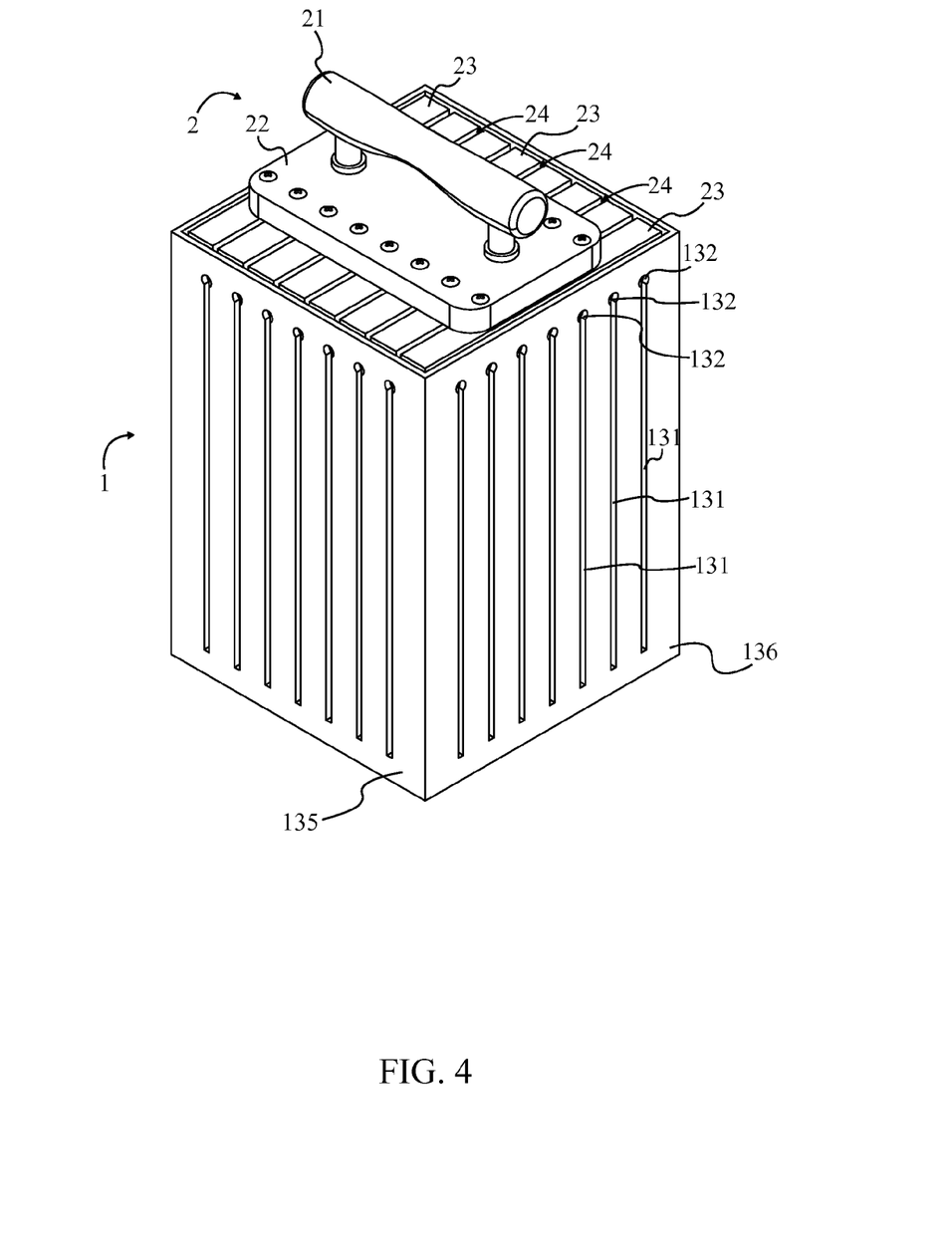
FIG. 4 is a perspective view of a use configuration of the present invention.
Figure 5:
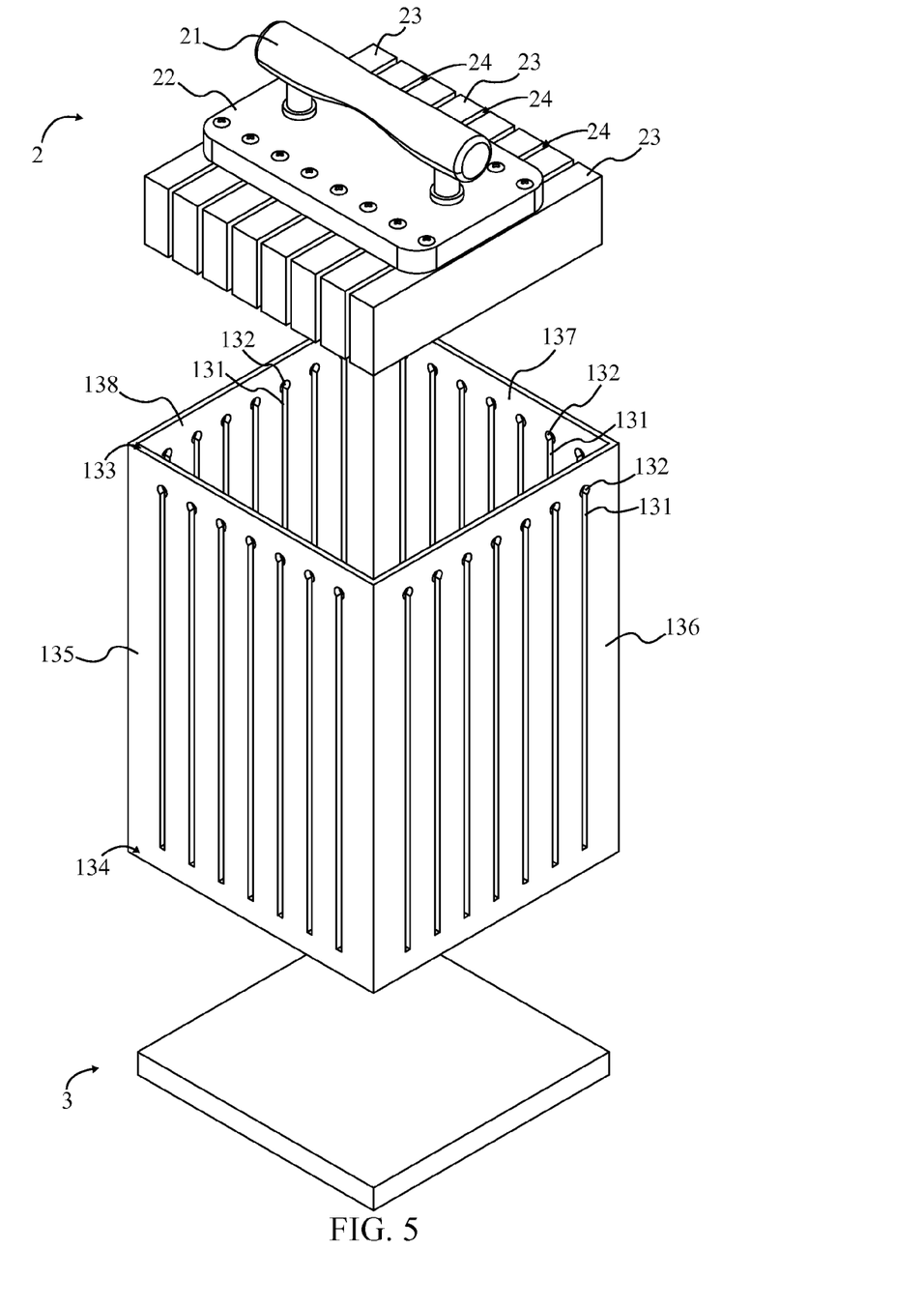
FIG. 5 is a perspective exploded view of the present invention.

The top inserting press 2, shown in FIG. 3, FIG. 4, and FIG. 5, comprises a handle 21, a base plate 22, a plurality of guide blocks 23, and a plurality of press guide slits 24. The handle 21 is centered on the base plate 22, and provides a grip to use for comfortably holding the top inserting press 2. The plurality of guide blocks 23 are located on the underside of the base plate 22, opposite the handle 21. The plurality of guide blocks 23 are evenly spaced from each other, with the gaps between each of the plurality of guide blocks 23 forming the plurality of press guide slits 24. The distance between each of the plurality of press guide slits 24 is equal to the distance between adjacent slits from the plurality of enclosure guide slits 131, with the plurality of press guide slits 24 being separated by the same specific interval spacing 4 used to separate the plurality of enclosure guide slits 131 from each other. As a result, when the top inserting press 2 is placed into the hollow enclosure 1, the plurality of press guide slits 24 are aligned with the plurality of enclosure guide slits 131 from two paired parallel walls. In the preferred embodiment this means the plurality of press guide slits 24 are aligned with the plurality of enclosure guide slits 131 from either the first wall 135 and third wall 137 or (if rotated 90 degrees) the second wall 136 and the fourth wall 138.

In the preferred embodiment the top inserting press 2 is designed to have a slightly shorter length and width than the interior of the hollow enclosure 1. This makes sliding the top inserting press 2 into the hollow enclosure 1, as there is literally room for error. If the top inserting press 2 were to have the same length and width as the interior of the hollow enclosure 1, then the top inserting press 2 would have to be perfectly aligned with the hollow enclosure 1 before a user could press down on the top inserting press 2. While the present invention would still function the same in such a scenario, providing a slightly smaller top inserting press 2 increases the ease of use of the present invention.

The cutting board 3 provides a bottom surface to support the chicken or other raw meat. The cutting board 3 should be thick enough that it does not accidently flip about its center, which would result in the cutting board 3 and chicken falling out. Preferably, the cutting board 3 will be just thick enough, in the range of one inch to one and a half inches. This will prevent the cutting board 3 from tilting inside the hollow enclosure 1, instead allowing for limited horizontal movement of the cutting board 3.

The present invention can be modularly assembled or constructed as a single piece. In the preferred embodiment, the hollow enclosure 1 is a unitary piece, as is the handle 21 and the cutting board 3. In other embodiments, the hollow enclosure 1 could be designed such that a user could detach the plurality of walls 13 from each other. In such an embodiment, the plurality of walls 13 would need to include an attachment method, such as latches, snap button fasteners, or even simple thumbscrews. While this is a possibility, there are a few drawbacks from the preferred unitary construction. The biggest drawback is that providing a modular hollow enclosure 1 increases the number of alcoves, nooks, and crannies in which bacteria and food particles may get stuck. This increases the difficulty in cleaning the hollow enclosure 1, and could prove especially troublesome for restaurants and other commercial establishments that need to pass health inspections. It is for reasons of cleanliness that the unitary hollow enclosure 1 is utilized in the preferred embodiment. A second disadvantage of using a detachable plurality of walls 13 is reduced strength and stability of the hollow enclosure 1. If the walls are not properly attached to each other, it is possible for the hollow enclosure 1 to collapse during use. Since the hollow enclosure 1 is designed to be used with a knife 5, such a collapse could injure a user. Thus, for safety reasons, the preferred embodiment utilizes the unitary hollow enclosure 1.

The present invention can also be constructed in a manner that integrates the cutting board 3 with the hollow enclosure 1, permanently connecting the two parts. However, similar to earlier concerns, this will increase the amount of surfaces and corners for food bits to hide in, making cleaning and passing health inspection more difficult. To provide better support for cutting board 3, the hollow enclosure 1 could include a bottom lip along the base end 134. This bottom lip would provide additional support for the hollow enclosure 1, reducing the chance of the cutting board 3 dropping from the hollow enclosure 1 while a user is moving the hollow enclosure 1.

While the present invention can be made from numerous different materials, cost and cleanliness should be taken into consideration. Preferably the material used will be low cost and dishwasher safe. Ideally, the materially should also be resilient enough to tolerate cuts from the blade of a knife 5. As long as the end product is usable, durable, and capable of passing health inspections, the specific material used can vary with different embodiments.

Figure 6:
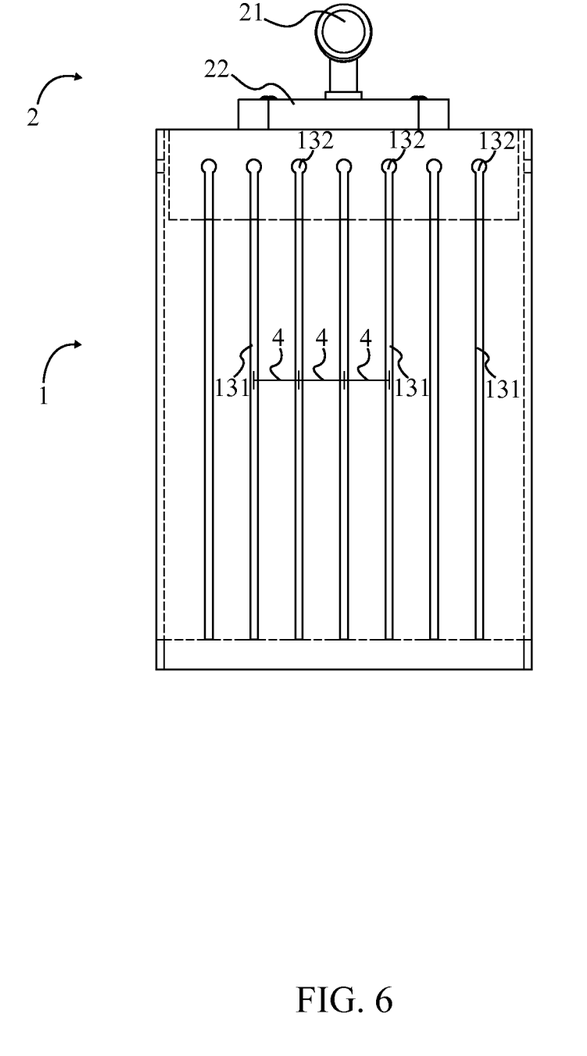
FIG. 6 is an internal side view of the use configuration of the present invention.
Figure 7:
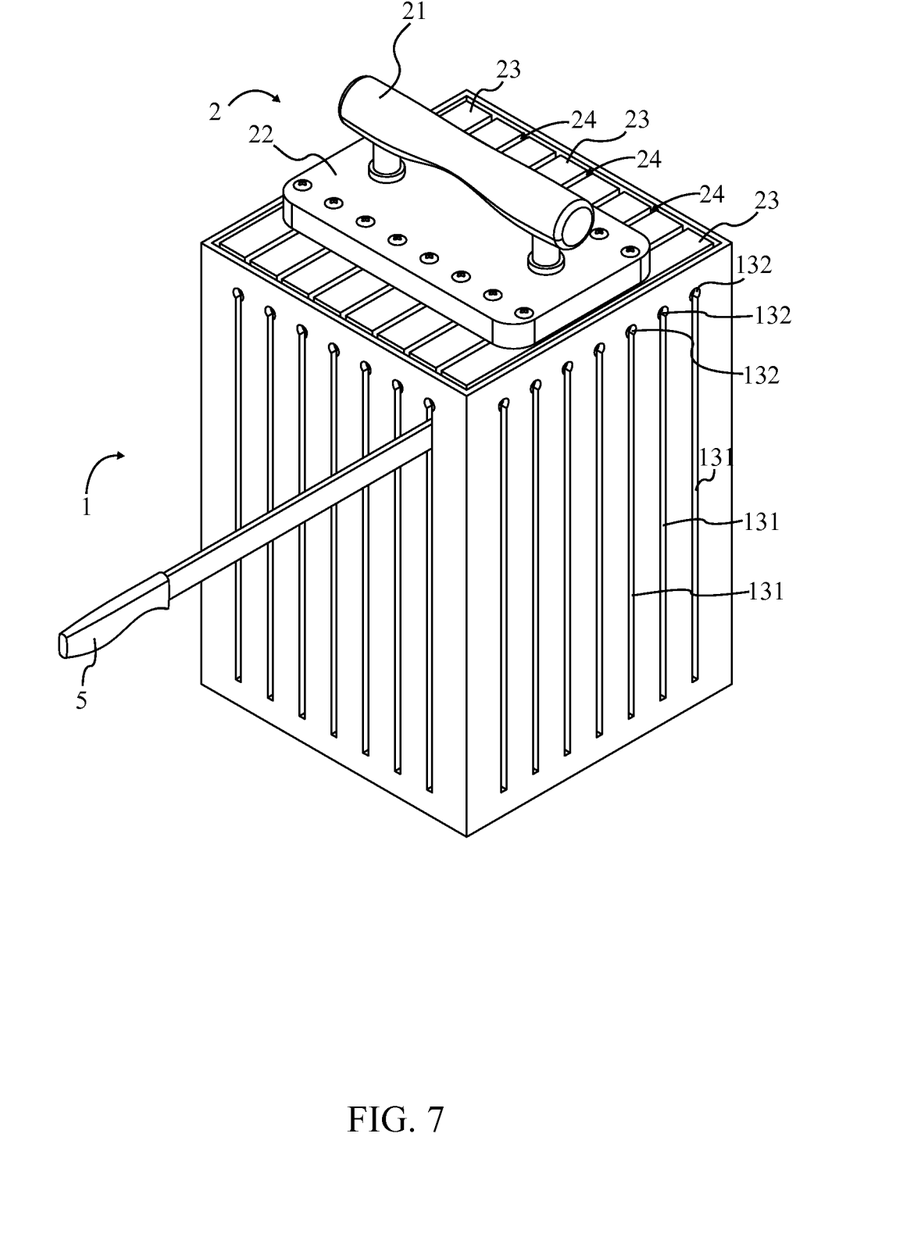
FIG. 7 is a perspective view showing a knife interacting with the present invention.
Figure 8:
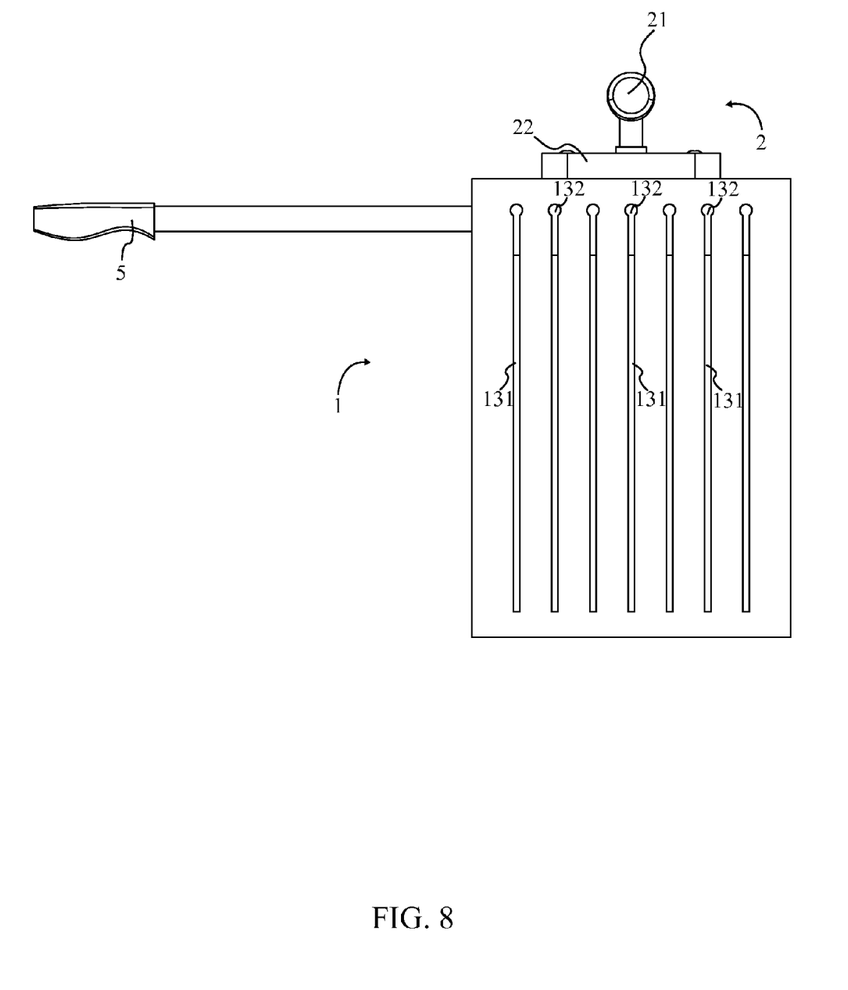
FIG. 8 is a side view showing the knife interacting with the present invention.
Figure 9:
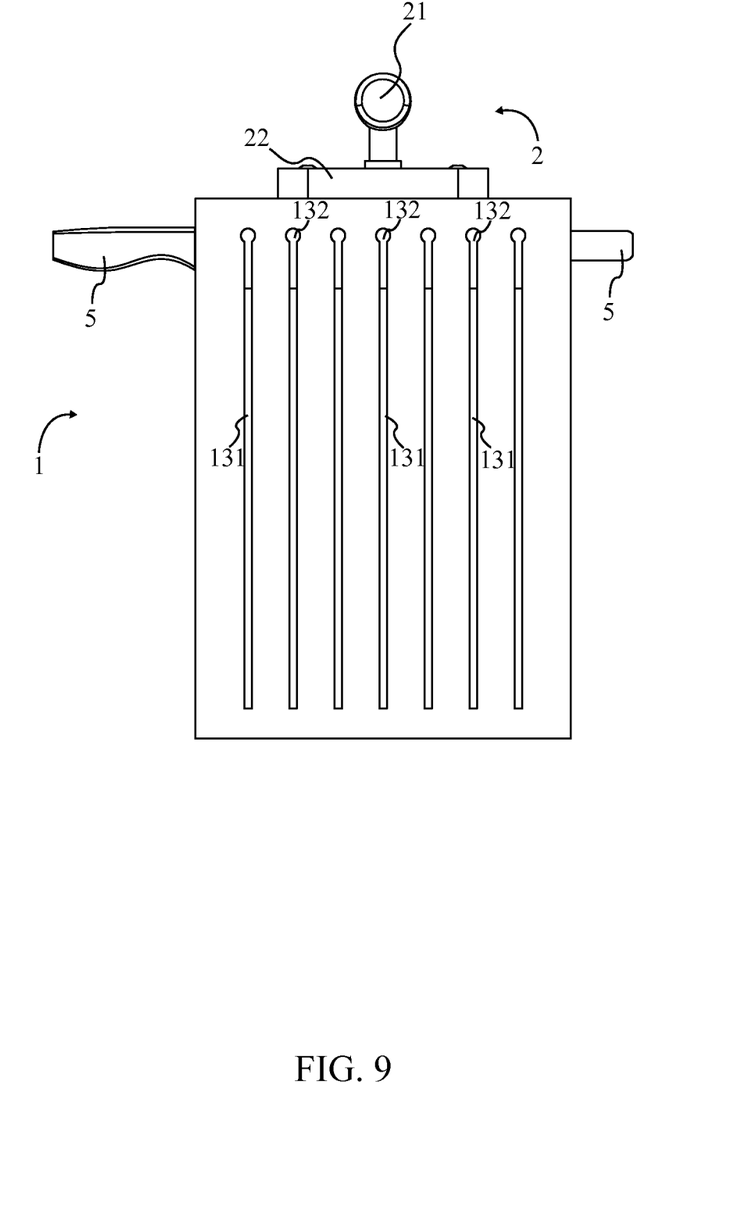
FIG. 9 is a side view showing the continuing interaction between the knife and the present invention.
Figure 10:
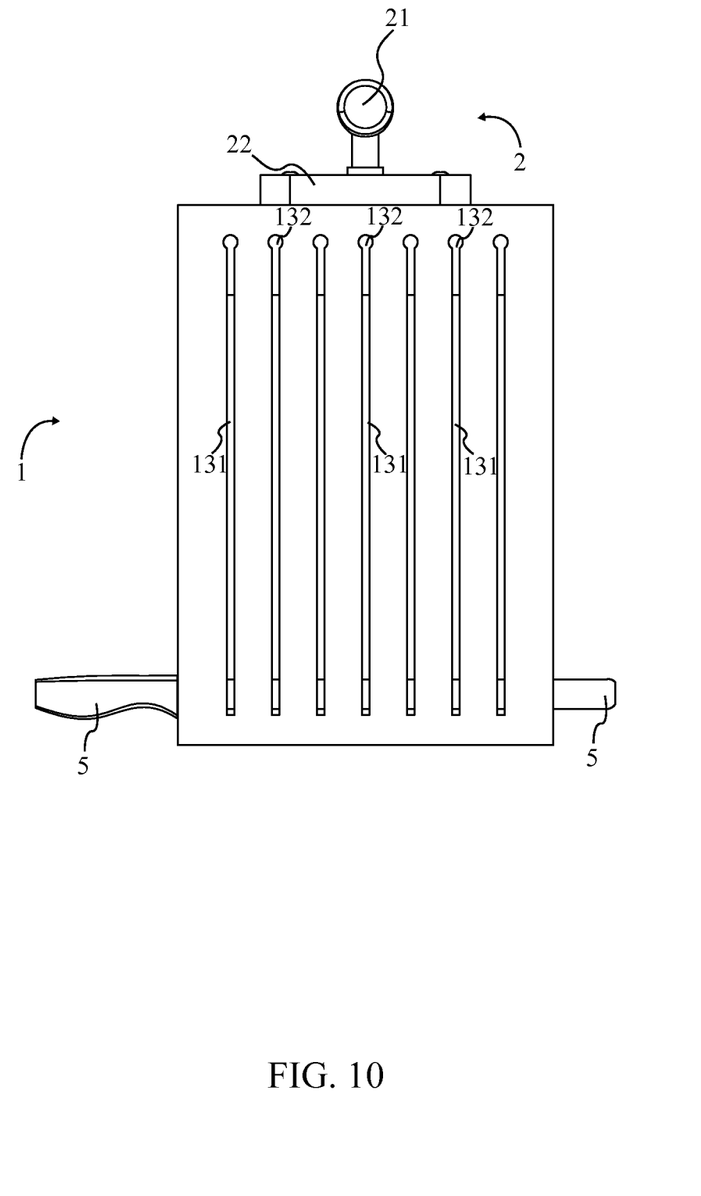
FIG. 10 is a side view showing further interaction between the knife and the present invention.

To utilize the present invention, the following steps are provided. First, the hollow enclosure 1 is placed on a stable surface. Second, the cutting board 3 is placed on the solid surface at the bottom of the hollow enclosure 1, such that the cutting board 3 effectively provides a bottom for the hollow enclosure 1. Once the hollow enclosure 1 and cutting board 3 are in place, the hollow enclosure 1 is filled with soft meat, such as raw chicken thighs or breasts. The hollow enclosure 1 can be partially filled or completely filled, with a maximum fill leaving enough room (about two inches) for the top inserting press 2 to press down on the raw chicken. Once the hollow enclosure 1 is filled, a user places the top inserting press 2 on top of the raw chicken, in between the hollow enclosure 1, and pushes down to stabilize the hollow enclosure 1 and contained raw chicken. The top inserting press 2 should be positioned so that the plurality of press guide slits 24 are aligned with the plurality of enclosure guide slits 131 on the first wall 135 and the third wall 137. This use configuration is shown in FIG. 4 and FIG. 6. The user then takes a long knife 5, with a blade length greater than the length of the hollow enclosure 1, and slices the chicken by inserting the knife 5 through aligned enclosure guide slits 131 on the parallel first wall 135 and third wall 137. The cutting process is illustrated in FIG. 7, FIG. 8, FIG. 9, and FIG. 10. The user can then cut down through all the chicken, with the knife 5 ending at the bottom of the enclosure guide slits 131. This process is repeated for successive enclosure guide slits 131 on the first wall 135 and third wall 137. After this, the top insert is rotated 90 degrees, such that the plurality of press guide slits 24 are aligned with the plurality of enclosure guide slits 131 on the second wall 136 and the fourth wall 138. The user then cuts through successive aligned enclosure guide slits 131 on the second wall 136 and the fourth wall 138. The end result is a large amount of chicken that has easily and quickly been cut and can now be used in cooking. After removing the cut chicken, the hollow enclosure 1, top inserting press 2, and cutting board 3 can easily be cleaned.

Transferring the cut chicken from the present invention to a separate container, such as a pot or pan, is done by removing the top inserting press 2 and grasping the hollow enclosure 1 along an edge of the top opening 11. While one hand grasps this top edge, the other hand is used to support the cutting board 3 and one edge of the bottom opening 12. In combination with the thickness of the cutting board 3, this allows a user to pour chicken into a separate container without the cutting board 3 sliding out. While it is also possible to transfer the cut chicken by other methods, such as with a scoop or by hand, this method is expedient and compliments the time and ease of use benefits of the present invention.

Although the invention has been explained in relation to its preferred embodiment, it is to be understood that many other possible modifications and variations can be made without departing from the spirit and scope of the invention as hereinafter claimed.

What is claimed is:

1. A bulk meat cutting apparatus comprises,
    a hollow enclosure;
    a top inserting press;
    a cutting board;
    the hollow enclosure comprises a top opening, a bottom opening, and a plurality of walls;
    each of the plurality of walls comprises a top end, a base end, and a plurality of enclosure guide slits;
    the top inserting press comprises a handle, a base plate, a plurality of guide blocks, and a plurality of press guide slits;
    each of the plurality of enclosure guide slits being equally spaced across each of the plurality of walls at a specific interval spacing;
    the handle being centrally positioned on the base plate;
    the handle being connected normal to the base plate;
    the plurality of guide blocks being connected to the base plate opposite the handle;
    the plurality of press guide slits being interspersed with the plurality of guide blocks;
    each of the plurality of enclosure guide slits comprises a widened tip;
    the widened tip being positioned adjacent to the top end;
    the plurality of enclosure guide slits being positioned adjacent to the top end and adjacent to the base end; and
    the plurality of enclosure guide slits being positioned along the plurality of walls.

2. The bulk meat cutting apparatus as claimed in claim 1 comprises,
    the plurality of walls comprises a first wall, a second wall, a third wall, and a fourth wall;
    the first wall and the third wall each being connected perpendicular to the second wall;
    the first wall being positioned adjacent to the second wall;
    the third wall being positioned adjacent to the second wall opposite the first wall;
    the first wall and the third wall each being connected perpendicular to the fourth wall;
    the first wall being positioned adjacent to the fourth wall;
    the third wall being positioned adjacent to the fourth wall opposite the first wall;
    the plurality of enclosure guide slits on the first wall being coincident with the plurality of enclosure guide slits on the third wall; and
    the plurality of enclosure guide slits on the second wall being coincident with the plurality of enclosure guide slits on the fourth wall.

3. The bulk meat cutting apparatus as claimed in claim 1 comprises,
    the top opening being delineated by the top end of each of the plurality of walls; and
    the top inserting press traversing into the hollow enclosure through the top end and between the plurality of walls.

4. The bulk meat cutting apparatus as claimed in claim 1 comprises,
    the bottom opening being delineated by the base end of each of the plurality of walls;
    the cutting board traversing into the hollow enclosure through the bottom opening; and
    the cutting board being perpendicularly positioned between the plurality of walls.

5. The bulk meat cutting apparatus as claimed in claim 1 comprises, the plurality of guide blocks being equally spaced across
the base plate at the specific interval spacing;
the plurality of press guide slits being delineated by the
plurality of guide blocks; and
the plurality of press guide slits being perpendicular to the
handle.

6. A bulk meat cutting apparatus comprises,
a hollow enclosure;
a top inserting press;
a cutting board;
the hollow enclosure comprises a top opening, a bottom
opening, and a plurality of walls;
each of the plurality of walls comprises a top end, a base
end, and a plurality of enclosure guide slits;
the top inserting press comprises a handle, a base plate, a
plurality of guide blocks, and a plurality of press guide
slits;
each of the plurality of enclosure guide slits being equally
spaced across each of the plurality of walls at a specific
interval spacing;
the handle being centrally positioned on the base plate;
the handle being connected normal to the base plate;
the plurality of guide blocks being connected to the base
plate opposite the handle;
the plurality of press guide slits being interspersed with the
plurality of guide blocks;
the plurality of walls comprises a first wall, a second wall,
a third wall, and a fourth wall;
the plurality of enclosure guide slits on the first wall being
coincident with the plurality of enclosure guide slits on
the third wall;
the plurality of enclosure guide slits on the second wall
being coincident with the plurality of enclosure guide
slits on the fourth wall;
the plurality of enclosure guide slits being positioned adjacent to the top end and adjacent to the base end;
the plurality of enclosure guide slits being positioned along
the plurality of walls;
the bottom opening being delineated by the base end of
each of the plurality of walls;
the cutting board traversing into the hollow enclosure
through the bottom opening;
each of the plurality of enclosure guide slits comprises a
widened tip; and
the widened tip being positioned adjacent to the top end.

7. The bulk meat cutting apparatus as claimed in claim 6
comprises,
the first wall and the third wall each being connected perpendicular to the second wall;
the first wall being positioned adjacent to the second wall;
the third wall being positioned adjacent to the second wall
opposite the first wall;
the first wall and the third wall each being connected perpendicular to the fourth wall;
the first wall being positioned adjacent to the fourth wall;
and
the third wall being positioned adjacent to the fourth wall
opposite the first wall.

8. The bulk meat cutting apparatus as claimed in claim 6
comprises,
the top opening being delineated by the top end of each of
the plurality of walls; and
the top inserting press traversing into the hollow enclosure
through the top end and between the plurality of walls.

9. The bulk meat cutting apparatus as claimed in claim 6
comprises,
the cutting board being perpendicularly positioned
between the plurality of walls.

10. The bulk meat cutting apparatus as claimed in claim 6
comprises,
the plurality of guide blocks being equally spaced across
the base plate at the specific interval spacing;
the plurality of press guide slits being delineated by the
plurality of guide blocks; and
the plurality of press guide slits being perpendicular to the
handle.

11. A bulk meat cutting apparatus comprises,
a hollow enclosure;
a top inserting press;
a cutting board;
the hollow enclosure comprises a top opening, a bottom
opening, and a plurality of walls;
each of the plurality of walls comprises a top end, a base
end, and a plurality of enclosure guide slits;
the top inserting press comprises a handle, a base plate, a
plurality of guide blocks, and a plurality of press guide
slits;
each of the plurality of enclosure guide slits being equally
spaced across each of the plurality of walls at a specific
interval spacing;
the handle being centrally positioned on the base plate;
the handle being connected normal to the base plate;
the plurality of guide blocks being connected to the base
plate opposite the handle;
the plurality of press guide slits being interspersed with the
plurality of guide blocks;
the plurality of walls comprises a first wall, a second wall,
a third wall, and a fourth wall;
the first wall and the third wall each being connected perpendicular to the second wall;
the first wall and the third wall each being connected perpendicular to the fourth wall;
the plurality of enclosure guide slits on the first wall being
coincident with the plurality of enclosure guide slits on
the third wall;
the plurality of enclosure guide slits on the second wall
being coincident with the plurality of enclosure guide
slits on the fourth wall;
the plurality of enclosure guide slits being positioned adjacent to the top end and adjacent to the base end;
the plurality of enclosure guide slits being positioned along
the plurality of walls;
the bottom opening being delineated by the base end of
each of the plurality of walls;
the cutting board traversing into the hollow enclosure
through the bottom opening;
the cutting board being perpendicularly positioned
between the plurality of walls;
the top opening being delineated by the top end of each of
the plurality of walls;
the top inserting press traversing into the hollow enclosure
through the top end and between the plurality of walls;
each of the plurality of enclosure guide slits comprises a
widened tip; and
the widened tip being positioned adjacent to the top end.

12. The bulk meat cutting apparatus as claimed in claim 11
comprises,
the first wall being positioned adjacent to the second wall;
the third wall being positioned adjacent to the second wall
opposite the first wall;
the first wall being positioned adjacent to the fourth wall;
and the third wall being positioned adjacent to the fourth wall opposite the first wall.

13. The bulk meat cutting apparatus as claimed in claim 11 comprises,
- the plurality of guide blocks being equally spaced across the base plate at the specific interval spacing;
- the plurality of press guide slits being delineated by the plurality of guide blocks; and
- the plurality of press guide slits being perpendicular to the handle.

* * * * *